United States Patent
Wolf et al.

(10) Patent No.: US 7,357,821 B2
(45) Date of Patent: *Apr. 15, 2008

(54) SYSTEM FOR CONVERTING FUEL AND AIR INTO REFORMATE

(75) Inventors: Felix Wolf, Augsburg (DE); Bernd Mittmann, Germering (DE); Christine Sallinger, Unterschleissheim (DE); Christian Hubbauer, Neuburg (DE); Thomas Kerscher, Munich (DE); Christian Baecker, Fuerstenfeldbruck (DE); Stefan Kunz, Munich (DE); Marcus Neumueller, Hechendorf (DE); Florian Metz, Mering (DE); Martin Wegner, Neubrandenburg (DE); Ingrid Lanzl, Munich (DE); Peter Lamp, Kaufering (DE)

(73) Assignee: Webasto AG, Stockdorf (DE)

( * ) Notice: Subject to any disclaimer, the term of this patent is extended or adjusted under 35 U.S.C. 154(b) by 539 days.

This patent is subject to a terminal disclaimer.

(21) Appl. No.: 10/482,998

(22) PCT Filed: Sep. 27, 2001

(86) PCT No.: PCT/EP01/11217

§ 371 (c)(1),
(2), (4) Date: Jan. 8, 2004

(87) PCT Pub. No.: WO03/022423

PCT Pub. Date: Mar. 20, 2003

(65) Prior Publication Data

US 2004/0191131 A1 Sep. 30, 2004

(30) Foreign Application Priority Data

Sep. 5, 2001 (DE) .................. 101 43 461
Sep. 10, 2001 (DE) .................. 101 44 400
Sep. 10, 2001 (DE) .................. 101 44 407
Sep. 10, 2001 (DE) .................. 101 44 408

(51) Int. Cl.
*C01B 3/32* (2006.01)
*B01D 50/00* (2006.01)

(52) U.S. Cl. .............. 48/127.3; 48/127.9; 48/197 R; 96/275; 96/304; 96/366; 261/115; 261/121.3

(58) Field of Classification Search .............. 48/61, 48/127.9, 127.3, 197 R; 422/224–228; 431/7; 252/373; 366/174–175; 96/275, 304, 366; 261/115, 121.3

See application file for complete search history.

(56) References Cited

U.S. PATENT DOCUMENTS 4,122,802 A * 10/1978 Noguchi et al. .............. 123/3
4,125,359 A 11/1978 Lempa (Continued)

FOREIGN PATENT DOCUMENTS

DE 24 33 811 A1 1/1976

(Continued)

*Primary Examiner*—N. Bhat
(74) *Attorney, Agent, or Firm*—David S. Safran (57) ABSTRACT

A system for converting fuel and air into reformate with a reformer which has a reaction space, a nozzle for supplying a fuel/air mixture to the reaction space, and a fuel feed for supplying fuel to the nozzle (14). The nozzle is a Venturi nozzle with an air inlet area and a diffusor area which extends downstream with respect to the air inlet area.

35 Claims, 9 Drawing Sheets

U.S. PATENT DOCUMENTS

| | | |
|---|---|---|
| 4,396,372 A | 8/1983 | Matumoto et al. |
| 4,651,524 A * | 3/1987 | Brighton ............... 60/274 |
| 5,899,075 A | 5/1999 | Dean et al. |
| 5,951,021 A * | 9/1999 | Ueta ............... 277/593 |
| 5,997,596 A | 12/1999 | Joshi et al. |
| 6,092,921 A * | 7/2000 | Wentinck et al. ....... 366/174.1 |
| 6,276,924 B1 | 8/2001 | Joshi et al. |
| 2003/0143506 A1 | 7/2003 | Hubbauer et al. |

FOREIGN PATENT DOCUMENTS

| | | |
|---|---|---|
| EP | 0 777 084 B1 | 1/2002 |
| FR | 1 066 117 | 6/1954 |
| FR | 2 226 055 | 11/1974 |
| GB | 739699 | 11/1955 |
| SU | 1 526 791 A1 | 12/1989 |
| WO | WO 98/28493 A1 | 7/1998 |
| WO | WO 01/71251 A1 | 9/2001 |

* cited by examiner

SYSTEM FOR CONVERTING FUEL AND AIR INTO REFORMATE

BACKGROUND OF THE INVENTION

1. Field of the Invention

The invention relates to a system for converting fuel and air into reformate with a reformer which has a reaction space, a nozzle for supplying a fuel/air mixture to the reaction space, and a fuel feed for supplying fuel to the nozzle. The invention furthermore relates to a process for installing one such system.

2. Description of Related Art

Generic systems are used to convert chemical energy into electrical energy. For this purpose fuel and air, preferably in the form of a fuel/air mixture, are supplied to the reformer. In the reformer then reaction of the fuel with atmospheric oxygen takes place, preferably the process of partial oxidation being carried out.

The reformate produced in this manner is then supplied to a fuel cell or a stack of fuel cells, with electrical energy being released by the controlled reaction of hydrogen, as a component of the reformate, and oxygen.

The reformer, as already mentioned, can be designed such that the process of partial oxidation is carried out in order to produce the reformate. In this situation, when using diesel as the fuel it is particularly beneficial to carry out prior reactions before the partial oxidation. In this way, long-chain diesel molecules can be converted into short-chain molecules with a "cold flame"; this ultimately promotes reformer operation. In general, a gas mixture which is reacted to $H_2$ and CO is supplied to the reaction zone of the reformer. Another component of the reformate can be $N_2$ from the air, and depending on the air ratio and the temperature, optionally, can also include $CO_2$, $H_2O$ and $CH_4$. In normal operation, the fuel mass flow is controlled according to the required output, and the air mass flow is adjusted to an air ratio in the range of $\lambda=0.4$. The reforming reaction can be monitored by different sensors, for example, temperature sensors and gas sensors.

In addition to the process of partial oxidation, it is also possible to carry out auto-thermal reforming. The process of partial oxidation, in contrast to auto-thermal reforming, is caused by the oxygen being supplied sub-stoichiometrically. For example, the mixture has an air ratio of $\lambda=0.4$. Partial oxidation is an exothermal reaction such that unwanted heating of the reformer can occur in a problematical manner. Furthermore, partial oxidation tends to intensify soot formation. To prevent soot formation, the air ratio $\lambda$ can be chosen to be smaller. This is achieved by having some of the oxygen used for oxidation from water vapor. Since oxidation with water vapor proceeds endothermically, it is possible to adjust the ratio between the fuel, oxygen and water vapor such that overall heat is neither released nor consumed. The auto-thermal reforming achieved in this way eliminates the problem of soot formation and undesirable overheating the reformer.

Likewise, it is possible for further steps of gas treatment to proceed following oxidation in the reformer. Particularly, methanization can be connected downstream of partial oxidation.

A current fuel cell system is for example a PEM system ("proton exchange membrane") which can typically be operated at operating temperatures between room temperature and roughly 100° C. Based on the low operating temperatures, this type of fuel cell is often used for mobile applications, for example in motor vehicles.

Furthermore, high temperature fuel cells are known, so-called SOFC systems ("solid oxide fuel cell"). These systems work for example in the temperature region of roughly 800° C., with a solid electrolyte ("solid oxide") being able to take over transport of oxygen ions. The advantage of these high temperature fuel cells over PEM systems is in the area of durability relative to mechanical and chemical loads.

One application for fuel cells, in conjunction with generic systems, includes not only stationary applications, but also applications in the motor vehicle domain, for example as "auxiliary power units" (APU).

For reliable operation of the reformer, it is important to supply the fuel or fuel/air mixture in a suitable manner to the reaction space of the reformer. For example, good mixing of the fuel and air and a good distribution of the fuel/air mixture in the reaction space of the reformer are advantageous for the operation of the reformer. Within the framework of this disclosure, when a fuel-air mixture is discussed it is always as materials added or to be added to the reaction space of the reformer. The added substances are not limited however to the mixture of fuel and air. But rather other substances can also be added, for example water vapor in the case of auto-thermal reforming. To this extent the concept of fuel/air mixture should be understood in this specification the concept is to be in this general form.

SUMMARY OF THE INVENTION

The object of the invention is to provide a system for reaction of fuel and air into reformate which has advantageous properties with respect to introducing the fuel/air mixture into the reaction space of the reformer.

This object is achieved with the features of the invention described below.

The invention is based on a generic system in which the nozzle is a Venturi nozzle with an air inlet area and a diffusor area which extends downstream with respect to the air inlet area. One example of such a Venturi nozzle causes a high axial air pressure gradient so that combustion air can be advantageously taken in and can be mixed with fuel in the diffusor area. In the air inlet area or in the area in which the fuel is supplied to the nozzle, the air flowing into the nozzle has a high speed and an accordingly low pressure. The high flow velocity of the air promotes absorption of the fuel by the in-flowing air. As the fuel/air mixture subsequently flows through the diffusor area of the Venturi nozzle, a pressure recovery occurs so that the mixture can flow into the combustion space of the reformer with sufficient pressure. Furthermore, in the diffusor area advantageous mixing of fuel and air takes place. Thus an effective and economical possibility is created for delivering the fuel/air mixture into the reformer. The installation cost and production costs can be optimized by the choice of different embodiments. For example, it is within the scope of the invention to form at least part of the diffusor area as a single piece with the reformer or the reformer housing or the housing of the reaction space, and it is also within the scope of the invention to make and use the nozzle that is completely independent of the reformer.

It is also advantageous to provide an opening angle of the diffusor area which is variable. Even if, in the simplest case, the diffusor area has a uniform opening angle, it can be useful especially for linking the diffusor part to the reaction space to provide a larger opening angle in the entry area into the combustion chamber. This supports the uniform distribution of the fuel/air mixture in the reaction space; while the opening angle of the part of the diffusor area which is farther upstream can be optimized with respect to the flow behavior in the upstream area.

The system of the invention also includes another particularly advantageous embodiment in which the liquid fuel being supplied through a needle to the Venturi nozzle in the vicinity of the air inlet area. This fuel needle is supplied with fuel via a fuel line. Based on the high flow velocity of the inflowing air, the fuel emerging from the fuel needle almost unpressurized and is pulled into filaments which then break down into droplets. The high air speeds which are necessary for good atomization in the air inlet area can be achieved as a result of the advantageous pressure recovery of the diffusor.

Likewise, the system of the invention can be include the advantageous embodiment in which the fuel feed comprises a pipe and a gas-atomizing nozzle such that a fuel/air mixture is supplied to the Venturi nozzle. Therefore, before the fuel enters the Venturi nozzle, mixing of the fuel with the air is already taking place which can provide reliable mixing.

In this embodiment, the gas-atomizing nozzle is another Venturi nozzle. That is, within the Venturi nozzle used within the framework of the invention and which can also be called a Venturi tube, there is a smaller Venturi nozzle with a fuel needle located within. In the smaller Venturi nozzle, emergence of the fuel from the fuel needle and premixing take place. The fuel/air mixture then enters the Venturi tube, i.e., the Venturi nozzle of the invention, and it is further mixed there in order to finally enter the reaction space.

In an especially preferred embodiment, means are provided such that secondary air can flow into the reaction space. The air entering through the Venturi nozzle into the reaction space, i.e., the air present in the fuel/air mixture, can be called primary air in this embodiment. The secondary air is advantageously conveyed through secondary air openings in the housing of the reaction space. The division of the air into primary air and secondary air can be useful for preparing a rich, easily ignited mixture at the outlet of the nozzle. This is particularly useful in the starting process of the system, since during ignition the reformer functions as a type of burner.

The system of the invention further includes the embodiment in which the fuel feed encompasses a fuel needle and that for the ratio of the inside diameter $d_i$ to the outside diameter $d_a$ of the fuel needle satisfies the following relationship:

$$0.7 \leq d_i/d_a < 1.$$

The fuel needle is therefore constructed to have an extremely thin-wall so that at a given fuel throughput, i.e., a given inside diameter, an outside diameter as small as possible is ensured. This ultimately leads to an especially small flow barrier due to the presence of the needle. The indicated tolerance range is chosen such that the needle can be produced without major difficulty; that is, the principle underlying this embodiment of the invention being optimized when the ratio of the inside diameter to outside diameter of the fuel needle approaches a value of 1.

The system of the invention is particularly advantageous when the Venturi nozzle is axially symmetrical and the fuel needle is axially aligned. The axial alignment of the fuel needle results in a low flow resistance for the combustion air; however, if the effort is made to introduce the fuel at a certain angle into the flow area of the Venturi nozzle, it is likewise possible to tilt the fuel needle against the axis of the Venturi nozzle. In this embodiment, the indicated useful ratio between the inside diameter and the outside diameter also contributes to minimization of the flow resistance.

Furthermore, it can be useful for the exit plane of the liquid fuel from the fuel needle to run perpendicularly to the flow direction of the liquid fuel through the fuel needle. In this embodiment, axially symmetrical emergence of the fuel from the fuel needle results, i.e., when ignoring the effects of gravity.

It can also be beneficial for the exit plane of the liquid fuel from the fuel needle to run obliquely to the flow direction of the liquid fuel through the fuel needle. In this embodiment, a preferred direction of the fuel emerging from the fuel needle can be implemented without the fuel needle tilting overall against the axis of the Venturi nozzle. Specifically, due to an oblique cut of the fuel needle in the exit area an increase of the flow resistance, as a result of the tilted fuel needle, can be avoided; while emergence of the fuel from the fuel needle directed against the force of gravity is still possible.

Furthermore, it is possible for the exit opening of the fuel needle to be provided with tips and/or to be crenelated. This makes it possible for the fuel to be introduced into the fuel chamber with great radial extension; which cannot be achieved in an optimum manner in openings without a structure on the edge of the exit due to constriction effects.

The system of the invention includes another embodiment in which the air inlet area has an essentially cylindrical part which has a transition to the diffusor area, the exit opening of the fuel needle is located in the cylindrical part and there is an axial distance between the exit opening of the fuel needle and the transition. This ensures that the liquid fuel which has emerged from the exit opening of the fuel needle is still transported together with the in-flowing air over a certain distance through a region of high flow velocity. This construction provides for especially good atomization. In most cases, it will be beneficial to place the exit from the fuel needle at the start of the cylindrical part of the air inlet area of the Venturi nozzle such that essentially the entire cylindrical area is available for good distribution of the atomized fuel in the rapidly flowing combustion air.

Furthermore, the system of the invention is advantageously embodied with respect to at least one installation of the reformer being in a motor vehicle where the opening of the fuel needle is located above the axis of the Venturi nozzle. This embodiment makes it possible to arrange the fuel needle parallel to the axis of the Venturi nozzle and at the same time to counteract the effect of gravity. If the installation position of the fuel needle is chosen with respect to the axis of the Venturi nozzle for an installation position of the reformer that is offset upwardly and radially from the axis and in the peripheral direction, two installation positions of the reformer can be achieved. For the two installation positions, favorable equalization of the force of gravity takes place by the location of the opening above the axis of the Venturi nozzle.

The system of the invention includes another embodiment in which an air guidance means in the air inlet area is provided which imparts a swirl to the in-flowing air. Within the framework of this invention, the concept of air inlet area should be understood very broadly. On the one hand, for example, the cylindrical part of the flow path through the Venturi nozzle can be preferred, but the area outside the Venturi nozzle can also be called the air inlet area. Upon swirling the air entering the nozzle, in the air entry area, the atomization quality and thus operation of the reformer can be clearly improved. The reason for this is that the air speed is increased due to the pronounced tangential motion component.

In this connection, it can be considered especially advantageous if the air guidance means comprise an air-guiding device with swirl blades. In one embodiment, one such air-guiding device is provided as a separate component independent of the nozzle and seated on the nozzle.

In such an embodiment, swirl blades are located on a carrier mounted on the nozzle assembly in order that two swirl blades at a time function together with the carrier and the nozzle assembly form a conical channel. The tangential air portion and thus the nozzle air swirl can be set depending on the angular position of these swirl blades to a radial plane. The swirl blades can be located approximately radially or tilted with respect to the radii. The swirl blades can also be flat or curved in the flow direction.

Likewise, it is possible for the air-guiding device to have a pot-shaped sleeve which is attached to the nozzle assembly which includes axial air holes formed in it, as well as peripheral air holes formed in the peripheral wall. In this embodiment, it also is possible to impart a defined swirl to the air flowing into the nozzle.

Further, with regard to this embodiment, it is possible for the peripheral air openings to be holes which are formed almost tangentially to the peripheral wall. The tangential arrangement of the holes makes it possible to impart a swirl to the air without further aids.

Additionally it can also be provided that on the peripheral air openings there are air guide blades. Therefore, it is unnecessary to directly impart the swirl through the peripheral air holes. Instead, air can be permitted to flow in through peripheral air holes formed in any manner, and then to impart the swirl by the air guide blades.

Furthermore, the system of the invention can include a nozzle composed of ceramic material and an air guidance means constructed as a single piece with the nozzle. In this embodiment, a nozzle can be economically produced. That is, the ceramic material can be easily machined, and numerous variations are possible with respect to shape of the nozzle. In particular, the air guidance means which imparts a swirl to the air outside the air inlet area can be made in one piece with the nozzle. As a result of using a ceramic, there is the additional advantage in that the area of the nozzle around the fuel needle located in the nozzle does not achieve overly high temperatures such that ignition of the amounts of fuel emerging from the nozzle cannot occur. The one-piece construction of the air guidance means makes it possible to easily adhere to tolerances, since mis-calibration of the air guidance means is no longer possible when the reformer is assembled.

Another advantageous embodiment of the invention involves a nozzle that has a means for holding a glow pin. The positioning of the glow pin with respect to the nozzle is an important parameter with respect to good starting behavior of the reformer. In heaters of the prior art, the glow pin was generally held by the reformer housing so that positioning fluctuations with respect to the nozzle could occur. These tolerances can be eliminated by the structure of the nozzle of the invention in which the nozzle itself includes a means for holding the glow pin. That is, the glow pin always has the same position relative to the nozzle.

Furthermore, the nozzle of the invention is advantageously embodied by the nozzle having an at least partially and essentially cylindrical shape, and by the air guidance means forming channels which are offset with respect to the radial directions. That is, the air flowing in perpendicular to the axis of the nozzle is not radially supplied, but instead supplied with an offset. This offset determines the swirl which is imparted to the air, thus the flow behavior and ultimately also the properties and the quality of the combustion.

It is especially useful for the air guidance means to have essentially triangular base surfaces with the corners being rounded. In this embodiment, the channel offset can be easily implemented; while the rounding of the corners is advantageous for uniform flow behavior.

In another preferred embodiment of this invention, the system is provided with the means for holding the glow pin in the form of a hole which runs slanted to the cylinder axis. The glow pin can then be simply introduced into the hole for suitable positioning. A stop on the glow pin and/or within the hole provides for the glow pin to be guided into its optimum position with respect to the nozzle.

The nozzle of the invention is particularly embodied when an at least essentially cylindrical part of the nozzle has an essentially cylindrical shoulder with an enlarged diameter and that the means for holding the glow pin are made as a hole which penetrates the shoulder and which runs slanted to the cylinder axis. In this embodiment, the glow pin can be held in the area so that it influences as little as possible the flow behavior of the in-flowing fuel-air mixture. When the cylindrical shoulder which has a larger diameter than the remaining nozzle body, this structure can be easily implemented.

Similarly, in an especially advantageous embodiment, an at least essentially cylindrical part of the nozzle has an essentially cylindrical shoulder with an enlarged diameter and that the cylindrical shoulder has recesses for holding the mounting pins. These mounting pins can be, for example, permanently mounted on the heat shield of the reformer. The relative positioning of the nozzle is fixed in this way by the recesses in the shoulder and the position of the mounting pins. Thus, mounting is especially easily possible with only small tolerances.

Another preferred embodiment the system of the invention can be provided in which the reformer, the nozzle and the fuel feed are located on one axis, and there are means for holding the nozzle and the fuel feed in alignment. That is, at least two axially aligned mounting pins which are mounted on the reformer, such that the nozzle and the fuel feed have positioning means which interact with the mounting pins. This construction enables the means for holding the components to interact with the mounting pins such that the reformer, the nozzle, the fuel feed and the means for holding the components are located axially in succession. In this embodiment, all positions of the components are oriented relative to the mounting pins so that narrow tolerances can be maintained. The fuel needle is positioned extremely accurately with respect to the nozzle. Furthermore, the positioning of the glow pin which is required for starting behavior is dictated by the positions of the mounting pins. Ultimately, a stable structure which ensures reformer operation with high quality is obtained.

The device of the invention can advantageously include a means for holding the components which is made as a spring that is held on the mounting pin by clamp disks. Attachment with one such spring has the advantage that mechanical stresses, especially as a result of temperature effects, can be equalized. In systems of the prior art, due to mechanical stresses undesirably high forces act on the reformer and on an optional heat shield of the reformer causing deformation.

Furthermore, it is also advantageous for the invention to include mounting pins that are welded onto the reformer. In this embodiment, the mounting pins are securely connected to the reformer in a defined position with respect to the latter.

In another especially preferred embodiment, between the nozzle and the reformer there is a seal which is used both for thermal insulation and also for matching the nozzle to the heat shield of the reformer.

It is particularly advantageous to provide a seal that has at least one mica layer facing the reformer and at least one graphite layer facing the nozzle. This embodiment allows the advantageous properties of the seal to be realized.

In another embodiment, the system of the invention is provided with a fuel feed that is composed of a knitted metal mesh which functions to break down bubbles in the fuel. Furthermore, in this way a counter-pressure for a damper, which is optionally located on the fuel line, is made available.

The invention furthermore includes a process for installing a system for conversion of fuel and air into reformate, there being provided at least two mounting pins, in which one nozzle is guided in the axial direction onto the mounting pins, a fuel feed is guided in the axial direction onto the mounting pins, and means for holding the components are guided in the axial direction onto the mounting pins. This process can be implemented especially easily since all components are supplied in the axial direction. Further, the process can be automated since large numbers can be produced within a short time.

The process of the invention further includes the feature that, before guiding the nozzle onto the mounting pins, a gasket is guided in the axial direction onto the mounting pins. The device can then be provided with the above described advantages of a gasket integrated into the process, particularly since the gasket is also guided in the axial direction onto the mounting pins.

The process of the invention is further embodied where the means for holding the components is a spring and the spring is guided, in a force-controlled manner, onto the mounting pins with the interaction of clamp disks which fix the spring in its end position. Thus, uniform tolerances can be established with respect to the heat and temperature properties of the structure within one series assembled components. As discussed above the spring imparts a spring force such tolerances, as a result of different heating of the components, different final temperatures of components and different coefficients of temperature expansion, can be equalized.

The present invention is based on the discovery that major advantages to the use a Venturi nozzle can be realized for the introduction of the fuel/air mixture into the reformer. A Venturi nozzle offers, for example, the possibility of liquid fuel being taken up especially efficiently in areas of high flow velocity into the in-flowing air, subsequently a sufficient pressure build-up is ensured to introduce the fuel/air mixture into a reformer. A Venturi nozzle can be economically produced in numerous embodiments. Furthermore, installation processes for the systems of the invention are particularly efficient.

The invention is explained by way of example with reference to the attached drawings.

DETAILED DESCRIPTION OF THE INVENTION

Figure 1:
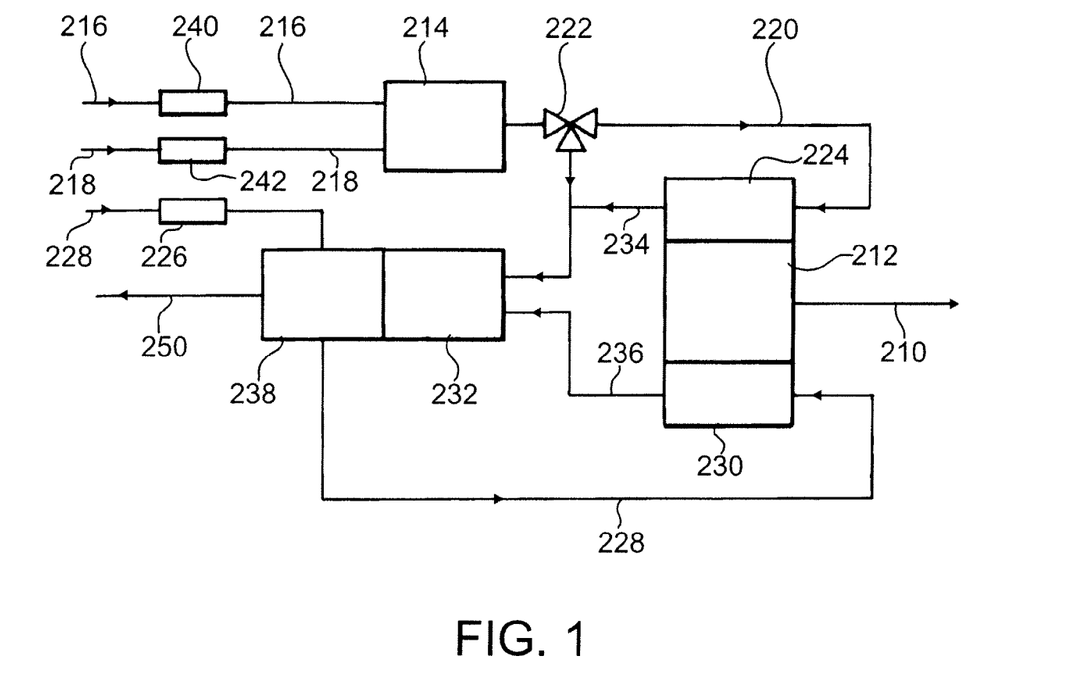
FIG. 1 is a schematic block diagram of a system in which an embodiment of the invention can be used.

FIG. 1 shows a schematic block diagram of a system in which this invention can be used. Fuel 216 is supplied to a reformer 214 via a pump 240. Furthermore, air 218 is supplied to the reformer 214 via a fan 242. The reformate 220 produced in the reformer 214 travels via a valve means 222 to the anode 224 of a fuel cell 212. The cathode 230 of the fuel cell 212 is supplied with cathode feed air 228 via a fan 226. The fuel cell 212 produces electrical energy 210. The anode exhaust gas 234 and the cathode exhaust air 236 are supplied to the burner 232. Likewise, reformate can be supplied to the burner 232 via the valve means 222. The thermal energy produced in the burner 232 can be supplied in a heat exchanger 238 to the cathode feed air 228 so that it is preheated. Exhaust gas 250 flows out of the heat exchanger 238.

The system shown in conjunction with the figures described below can be used to supply a fuel/air mixture to the reformer 214.

Figure 2:
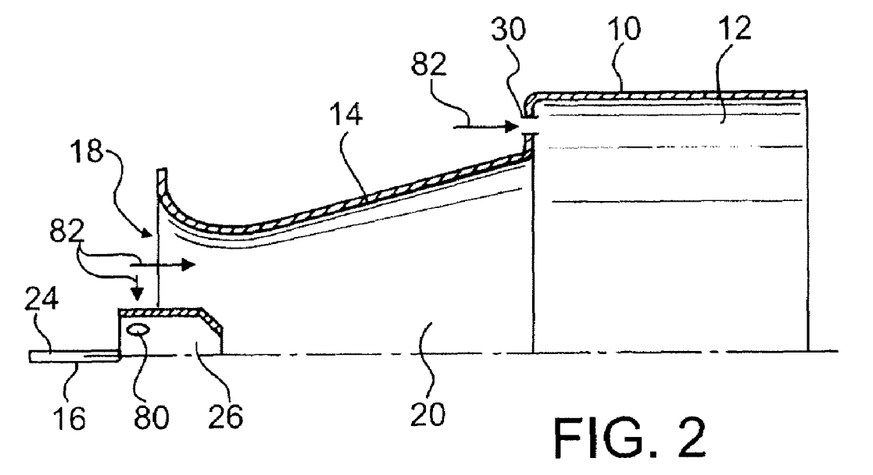
FIG. 2 shows a schematic sectional view of one embodiment of the invention.

FIG. 2 shows a schematic sectional view of one embodiment of the system of the invention. The system comprises a reformer 10 with a reaction space 12. A Venturi nozzle 14 is connected to the reformer 10. The nozzle has an air inlet area 18 and a diff-user 20 with a cross section which increases in the direction to the reformer 10. Within the Venturi nozzle 14 in the vicinity of the air inlet area 18 there is a fuel feed 16. The fuel feed 16 comprises a pipe 24 for the feed of fuel and a binary nozzle 26. The binary nozzle 26 is provided with an opening 80 into which air 82 can flow. The air is mixed within the binary nozzle 26 with fuel supplied by the pipe 24. From the downstream opening of the binary nozzle 26, a fuel/air mixture can emerge which is entrained by the air 82 which enters the air inlet area 18 of the Venturi nozzle 14. The fuel/air mixture mixes with the air 82 which has flowed into the air inlet area 18 of the Venturi nozzle 14, and the resulting fuel/air mixture travels via the diffuser 20 into the reaction space 12 of the reformer 10. Furthermore, an opening 30 to the reaction space 12 of the reformer 10 can be provided through which secondary air 82 can enter the reaction space 12.

Figure 3:
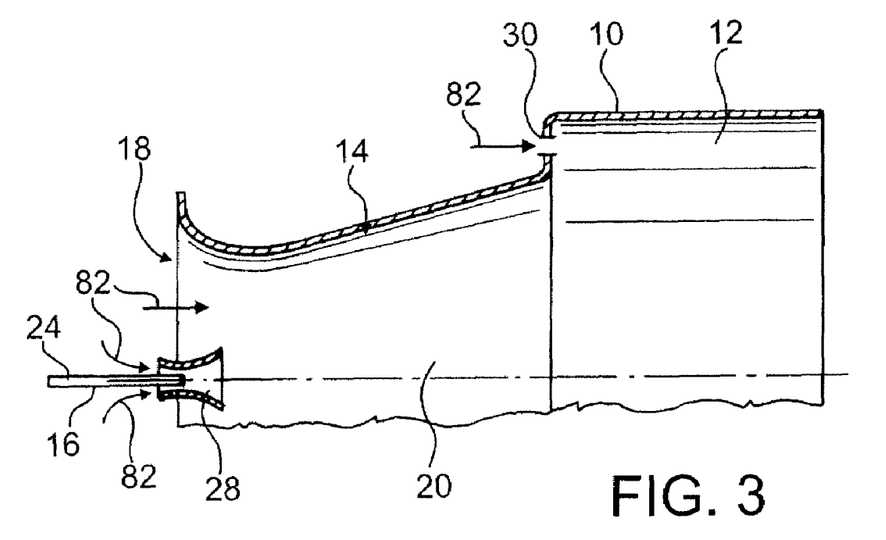
FIG. 3 shows a schematic sectional view of another embodiment of the invention.

FIG. 3 shows a schematic sectional view of another embodiment of the system of the invention. The fuel feed 16 in the system shown in FIG. 3 is different from in the system shown in FIG. 2. The fuel is first supplied in turn via a pipe 24, but then travels into another Venturi nozzle 28 which is much smaller than the Venturi nozzle 14. In the Venturi nozzle 28 the liquid fuel is picked up and atomized by the air 82 which is flowing past the exit opening of the pipe 24 at high speed. The resulting fuel/air mixture is then entrained by the air 82 which flows in the air inlet area 18 of the Venturi nozzle 14 so that it can mix with it.

Figure 4:
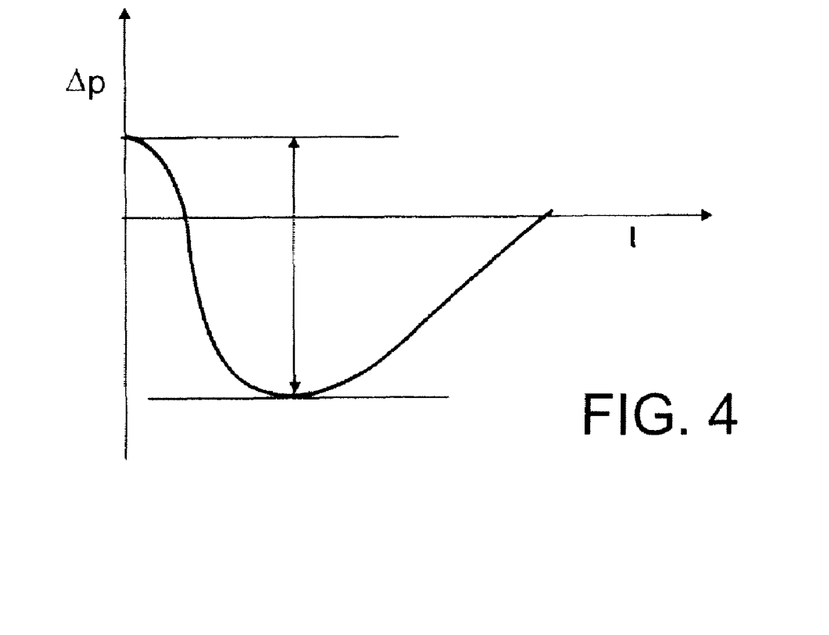
FIG. 4 is a diagram which illustrates the axial pressure behavior in the Venturi nozzle.

FIG. 4 is a diagram which illustrates the axial pressure distribution in a Venturi nozzle. The pressure difference Δp between the pressure at a certain coordinate and the pressure in the reaction space 12 (see FIGS. 2 and 3) is plotted. The air 82 is generally fed into the air inlet region 18 of the Venturi nozzle 14 by a fan (not shown), this air being made available with only a low overpressure. As a result of the speed increase of the in-flowing air the pressure drops to a minimum value. As the air continues to flow through the diffuser of the Venturi nozzle, the flow velocity decreases again and the pressure increases gradually to the reaction chamber pressure.

Figure 5:
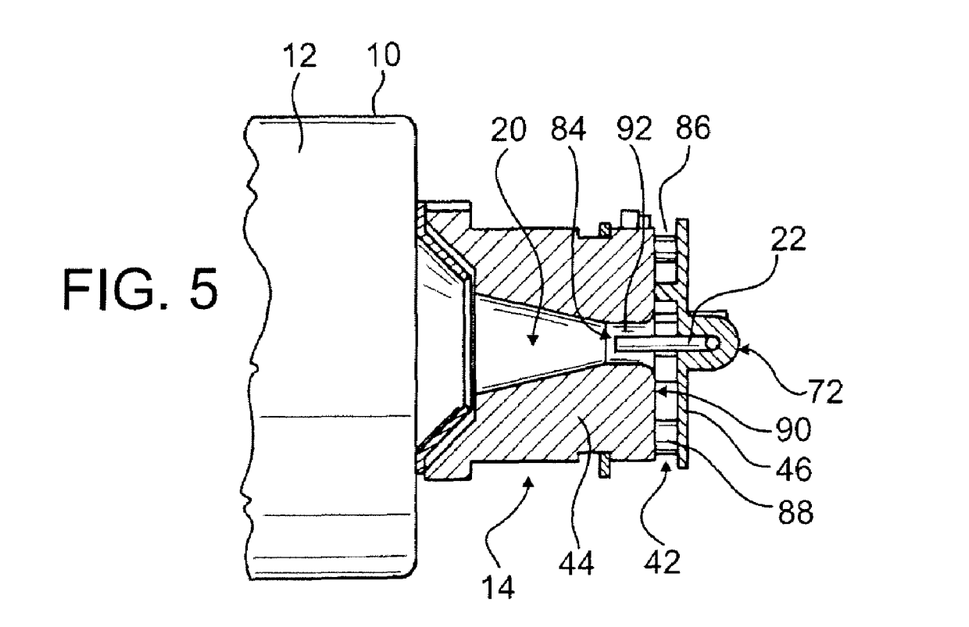
FIG. 5 shows a schematic sectional view of another embodiment of the invention.

FIG. 5 shows a schematic sectional view of another embodiment of a system of the invention. The system comprises a Venturi nozzle 14 with a nozzle assembly 44. Furthermore, there is a fuel feed 72 for supplying liquid fuel to the nozzle 14. The fuel is supplied to the air inflow area 92 via the fuel exit 84 of the fuel needle 22, is entrained by the in-flowing air and then travels as a fuel/air mixture to the reaction space 12 of the reformer 10 via the diffuser 20. The nozzle assembly 44 is connected downstream of an air-guiding device 42 which impresses a swirl on the air flowing into the Venturi nozzle 14. The air-guiding device 42 is a carrier 46 which is located at a distance opposite the end face 90 of the nozzle assembly 44, and is for example circular. The air-guiding device 42 forms an annular gap 86 together with the end face 90 of the nozzle assembly 44. On the carrier 46 there are swirl blades 88 which are pointed against the end face 90 of the nozzle assembly 44 and adjoin it in the assembled position.

Figure 6:
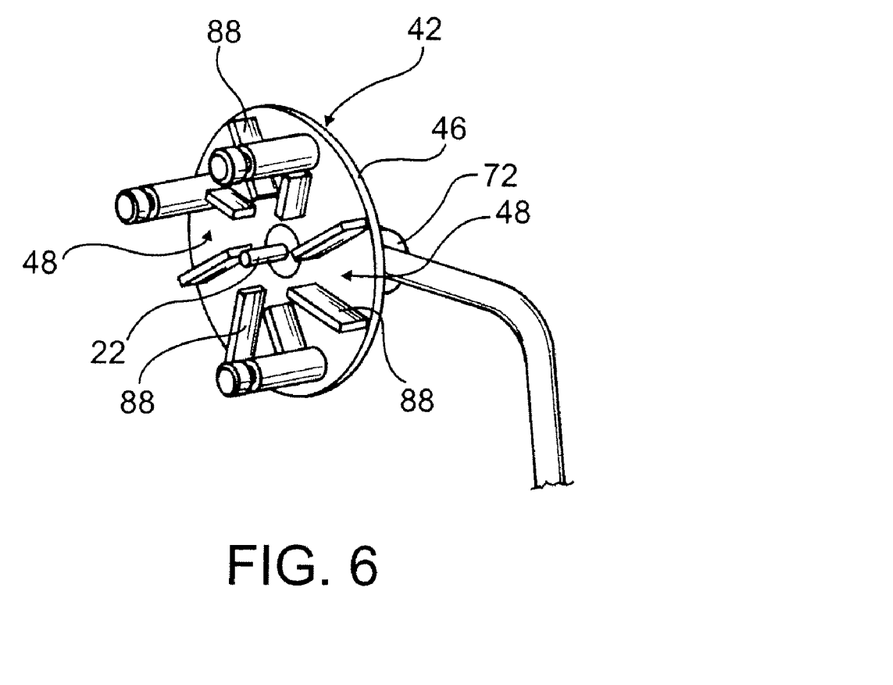
FIG. 6 shows a perspective of a carrier with an air-guiding device for use in an embodiment of the invention.

FIG. 6 shows a perspective view of an air-guiding device 42 for use in a system of the invention. The swirl blades 88 are arranged offset on a carrier 46 with respect to the radius of the circular arrangement in order to produce a tangential flow component. Two swirl blades 88 cooperate with the carrier 46 and the nozzle assembly 44 form a conical channel 48.

Figure 7:
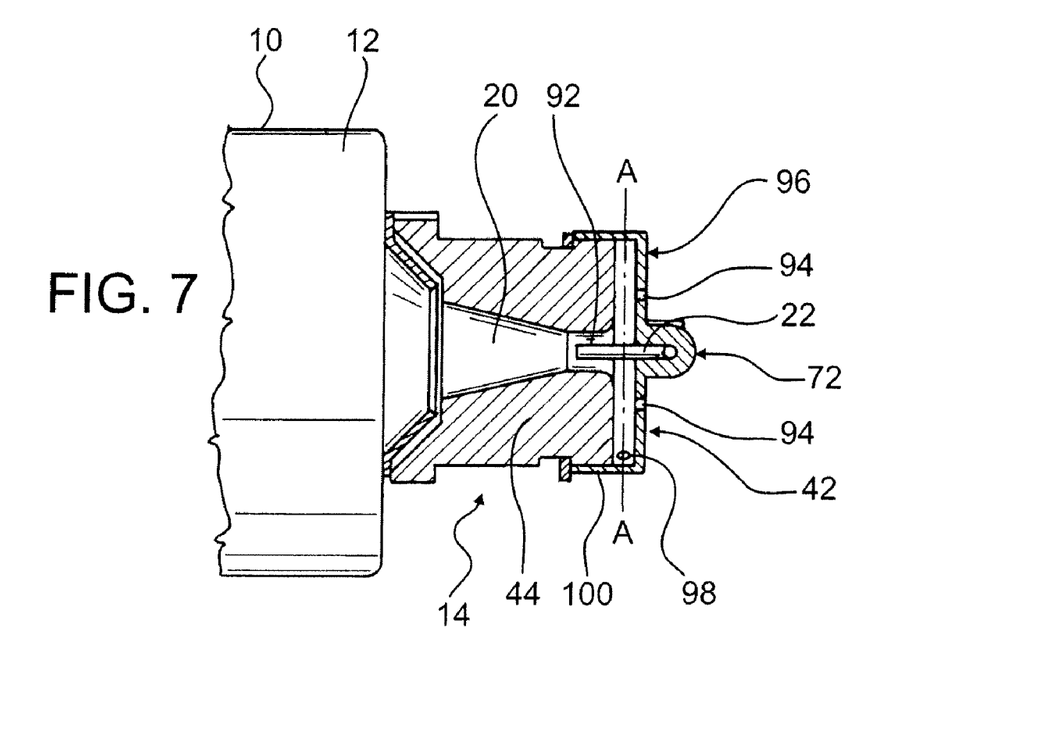
FIG. 7 shows schematic sectional view of another embodiment of the invention.

FIG. 7 shows a schematic cross sectional view of another embodiment of a system of the invention. This embodiment of the system of the invention differs from that shown in FIG. 5 in that the air-guiding device 42 is made as a pot-shaped sleeve 96. The sleeve 96 in its bottom has axial holes 94, and in the peripheral wall 100 of the sleeve 96 tangential holes 98 are formed. The sleeve 96 is attached to the nozzle assembly of the Venturi nozzle 14, for example by slipping it on or by some other form of positive, non-positive or material connection. The axial holes 94 and the tangential holes 98 are matched to one another such that a defined swirl is imparted to the in-flowing air.

Figure 8:
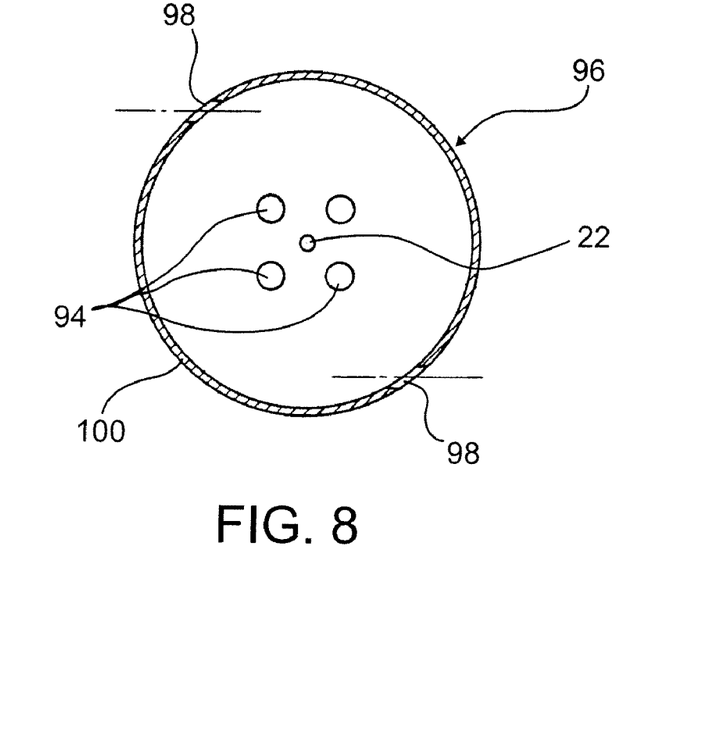
FIG. 8 shows a schematic sectional view along the cross sectional plane identified by A-A in FIG. 7.

FIG. 8 shows a schematic sectional view along the cross sectional plane identified by A-A in FIG. 7. A sample arrangement of the axial holes 94 and the tangential holes 98 in the sleeve 96 is illustrated. By varying the number, size and arrangement of openings or holes 94, 98, the swirl of the air flow can be adjusted if desired.

Figure 9:
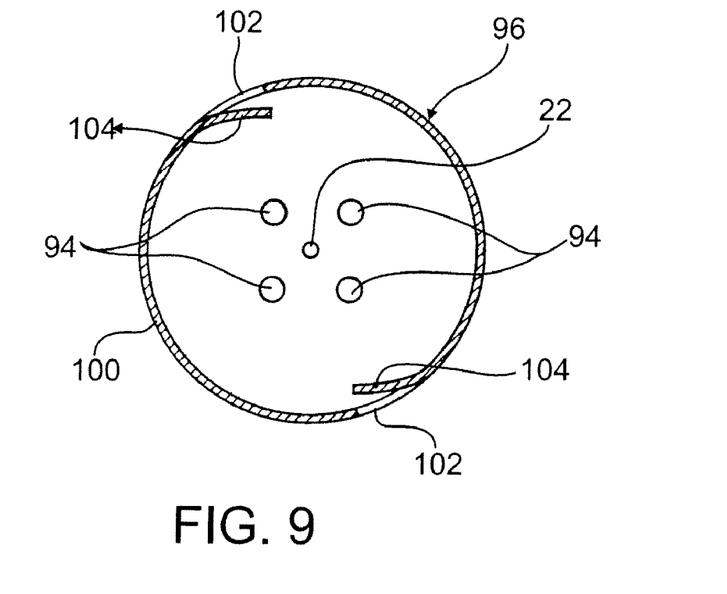
FIG. 9 shows a schematic sectional view, corresponding to the section as shown in FIG. 8, of another embodiment of an air-guiding device.

FIG. 9 shows a schematic sectional view, corresponding to FIG. 8, of another embodiment of an air-guiding device. The sleeve 96 has in its peripheral wall 100 air holes 102 which are bounded towards the center of the sleeve 96 by an air guide blade 104 assigned to each respective air opening 102. A tangential flow component is therefore impressed on the in-flowing air by the air guide blades 104.

Figure 10:
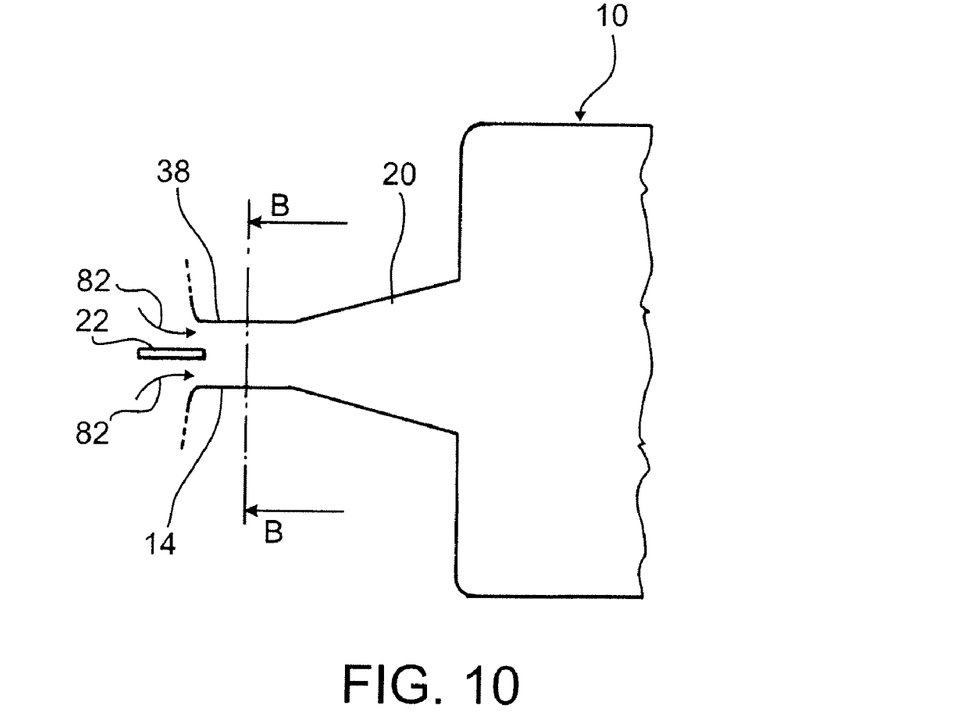
FIG. 10 shows a schematic sectional view of another embodiment of the invention.

FIG. 10 shows a schematic sectional view of another embodiment of a system of the invention. The function and properties of the components shown result from the preceding description with consideration of the reference numbers. The representation is highly schematic so that the important components of the system of the invention can be illustrated. In the cylindrical part 38 of the Venturi nozzle 14 there is a fuel needle 22 for supplying fuel. On the one hand, it is a desirable to arrange the fuel needle 22 in exactly this narrowed cylindrical part 38 of the Venturi nozzle 14, since the combustion air 82 flowing with high flow velocity promotes atomization of the fuel. On the other hand, the fuel needle 22 also represents a flow barrier to the in-flowing combustion air 82. This is a basic problem which is solved by the features described below in conjunction with the system of the invention. Line B-B identifies a radial cutting plane to which reference is made in the following description.

Figure 11:
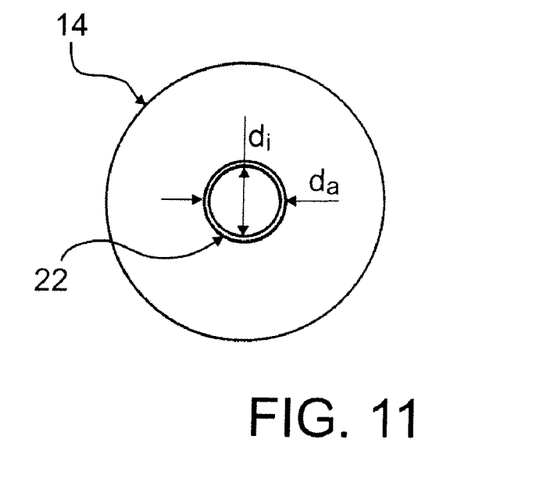
FIG. 11 shows a schematic sectional view along the plane identified by B-B in FIG. 10.

FIG. 11 shows a sectional view along the plane identified in FIG. 10 with B-B. It can be easily recognized that this invention solves the problem described in conjunction with FIG. 10. That is, by choosing the ratio between the inside diameter $d_i$ and the outside diameter $d_a$ of the fuel needle 22 to be as near a value of 1 as possible, the fuel needle 22 represents a minimum flow resistance for the in-flowing combustion air in the Venturi nozzle 14.

Figure 12:
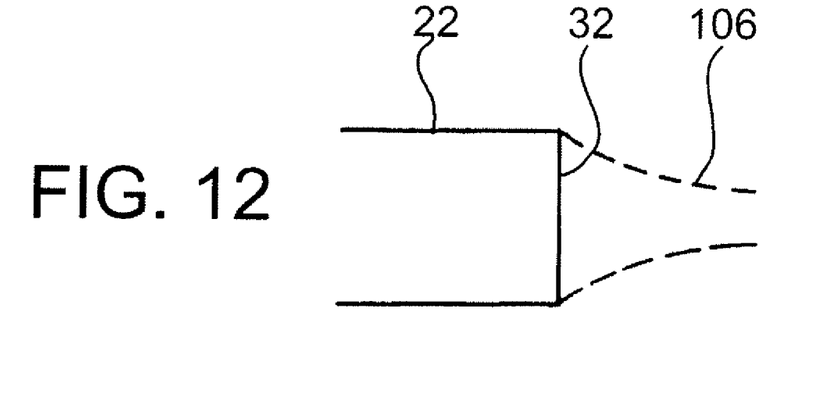
FIG. 12 shows a fuel needle with a first exit opening for use in any embodiment of the invention.

FIG. 12 shows a fuel needle 22 with a first exit opening for use in a system of the invention. In this embodiment, the exit plane 32 of the fuel 106 from the fuel needle 22 is perpendicular to the main flow direction of the fuel 106. This results in constriction of the fuel 106 outside the fuel needle 22 which can be disadvantageous with respect to the uniform distribution of the fuel 106 in the Venturi nozzle and ultimately in the combustion chamber.

Figure 13:
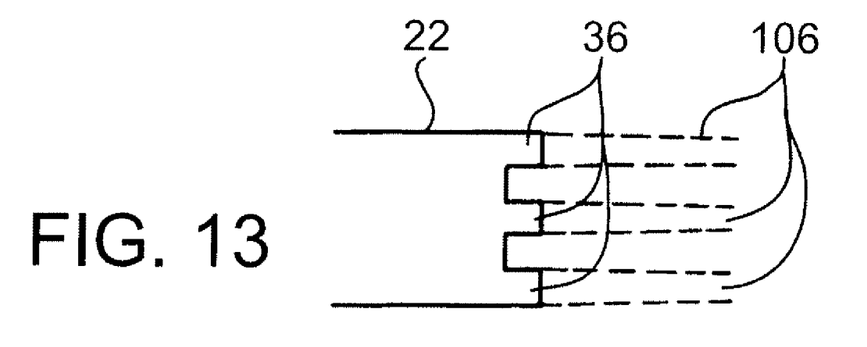
FIG. 13 shows a fuel needle with a second exit opening for use in any embodiment of the invention.

FIG. 13 shows a fuel needle 22 with a second outlet opening for use in a system of the invention. In this embodiment, the exit opening of the fuel needle 22 has crenelations 36. These crenelations 36 concentrate emerging fuel 106 in certain areas and ultimately the result in the fuel 106 being distributed homogeneously over the entire flow cross section.

Figure 14:
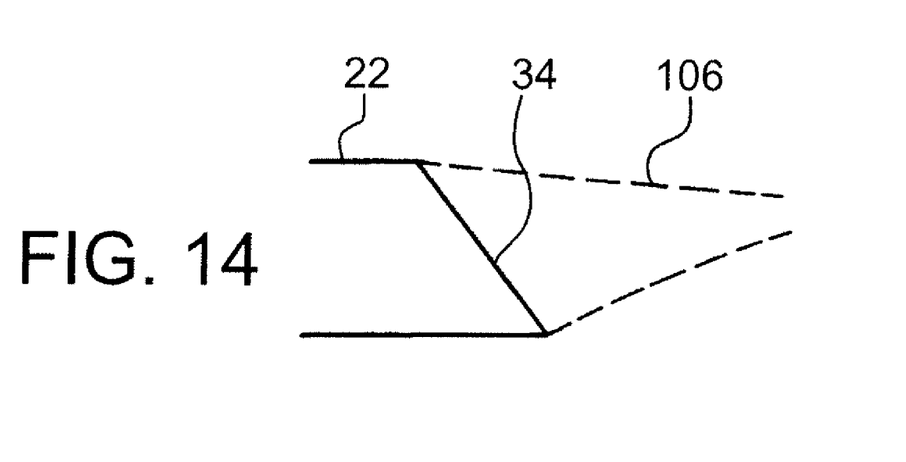
FIG. 14 shows a fuel needle with a third exit opening for use in any embodiment of the invention.

FIG. 14 shows a fuel needle 22 with a third exit opening for use in a system of the invention. In this embodiment, the fuel needle 22 is provided with a beveled opening 34. The beveled opening 34 imparts to the out-flowing fuel 106 a preferential direction so that for example the effect of the force of gravity can be counteracted.

The particular designs of the fuel needles can be combined in any manner with any other embodiments of the invention. For example, it is possible for a slanted exit plane to be combined with a crenelated structure.

Figure 15:
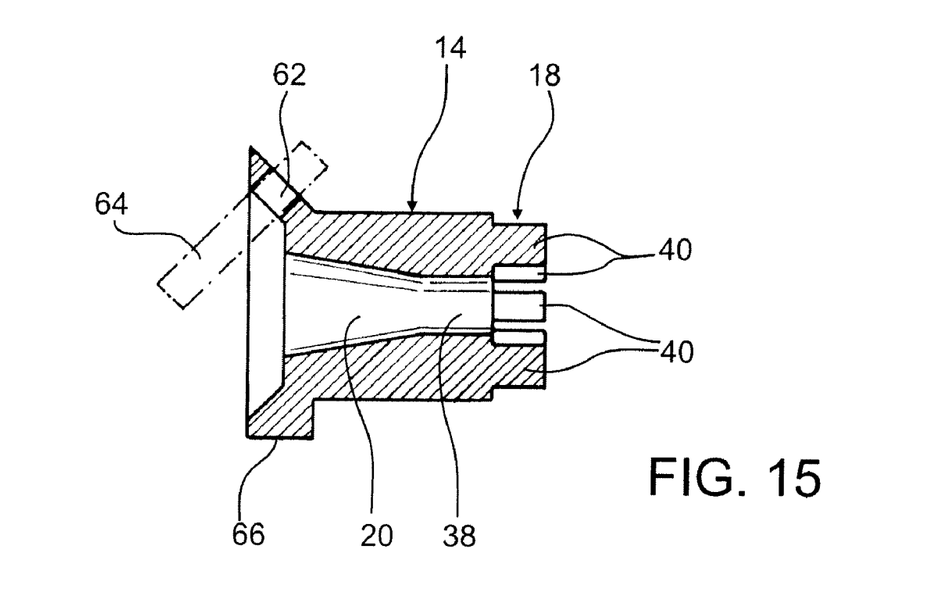
FIG. 15 shows a partially cut side view of a nozzle for use in any embodiment of the invention.

FIG. 15 shows a partially cutaway side view of one embodiment of a nozzle 14 for use in a system of the invention. The Venturi nozzle 14 is made of ceramic material which simplifies the production of the nozzle 14 compared to metal nozzles. In the air inlet area 18, there are air guidance means 40 which are constructed in one piece with the nozzle 14. In particular, the air-guidance means 40 are also made of ceramic material. The air guide means 40 are aligned such that a swirl is imparted to the supplied air the details of which are illustrated below with reference to FIG. 16. The Venturi nozzle 14 is furthermore provided with a hole 62. A glow pin 64 can be inserted into this hole 62 and is used to ignite the fuel/air mixture entering the reaction space which is not shown in FIG. 15.

In particular, when the system of the invention starts, the reformer works in the manner of a burner so that initial ignition of the fuel/air mixture is necessary. It is advantageous in an arrangement of the glow pin 64 in a hole 62 of the nozzle 14 that the positioning of the glow pin 64 is fixed with respect to the nozzle 14. Therefore, the positioning of the glow pin 64 does not depend on any other components. In this way, very precise tolerances can be maintained with respect to the installation location of the glow pin 64. The hole 62 advantageously penetrates the cylindrical shoulder 66 of the nozzle 14 with an increased radius which has the advantage that the flow behavior of the nozzle 14 is influenced only little by the hole 62 or by the glow pin 64 which is located in the hole 62.

Figure 16:
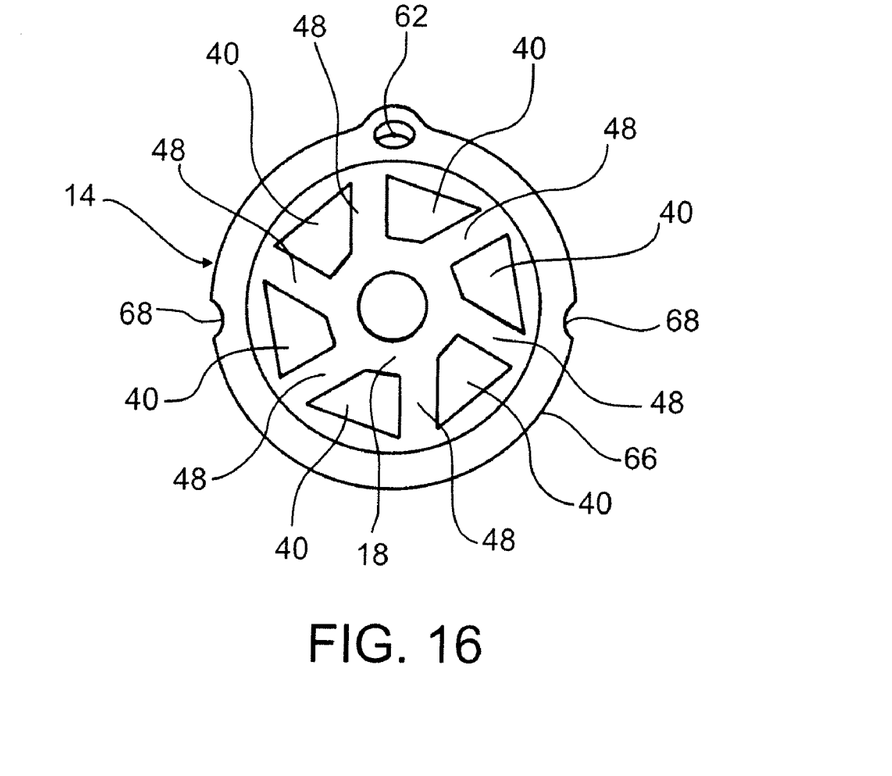
FIG. 16 shows an overhead view of the air inlet area of a nozzle for use in a system as claimed in the invention.

FIG. 16 shows an overhead view of the air inlet area 18 of a nozzle 14 for use in the system of the invention. One possible configuration of the air inlet area 18 by the air guide elements 40 is shown. The air guide elements 40 form channels 48 for the in-flowing air. These channels 48 have an offset position with respect to the radius of the structure located essentially on one axis. Air flowing in from the outside undergoes a swirl which provides for advantageous properties with respect to atomization of the fuel emerging from the fuel needle. Furthermore, in this illustration, the arrangement of the opening 62 for holding the glow pin can be seen as well. The glow pin penetrates an essentially cylindrical shoulder 66. Furthermore, the shoulder 66 is provided with recesses 68 which define the installation position of the nozzle 14 which is detailed below with respect to FIG. 17.

Figure 17:
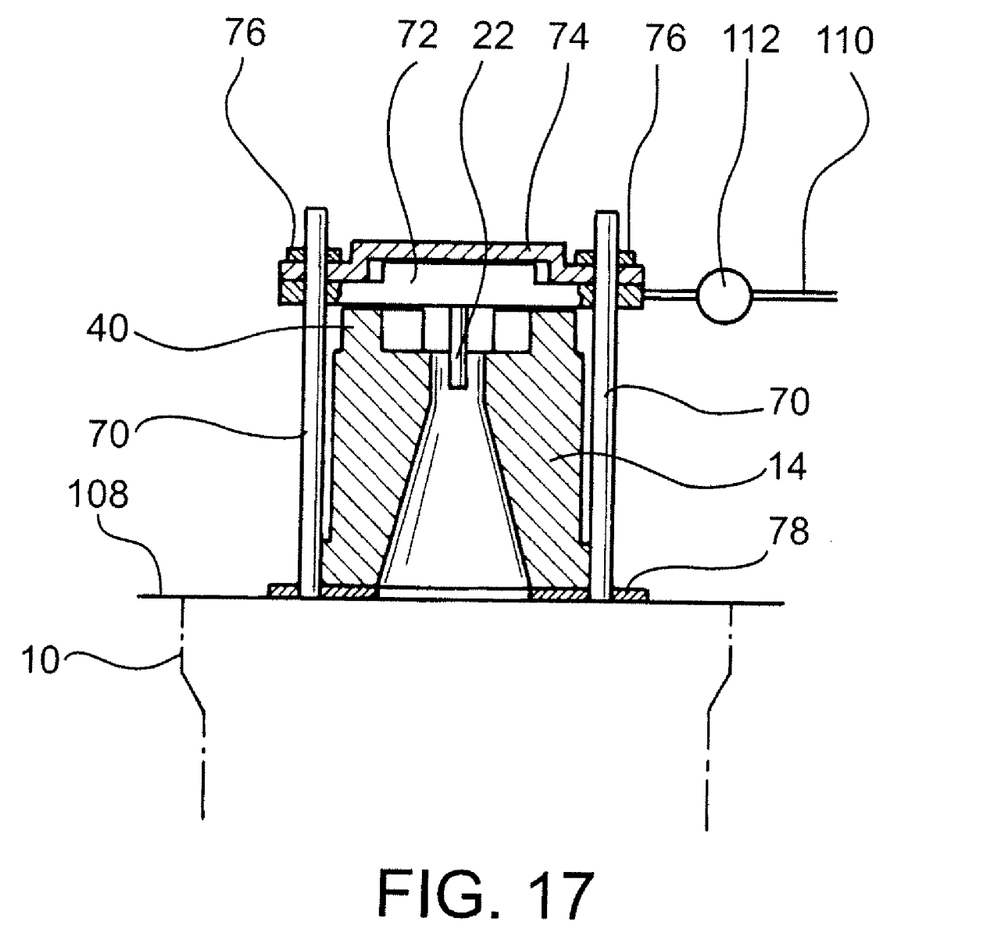
FIG. 17 is a schematic sectional view of another embodiment of the invention.

FIG. 17 shows a schematic cross sectional view of another embodiment of a system of the invention in which the end of the reformer 10 facing the nozzle 14 is shown. The reformer 10 is bordered by the heat shield 108. On this heat shield 108, there are two mounting pins 80 in this embodiment. The mounting pins 70 can be welded to the heat shield 108 or to the reformer 10. The mounting pins 70 will define the positioning of the other components as described below. Initially, a seal 78, which preferably includes a mica layer turned toward the reformer 10 and a graphite layer turned toward the nozzle 14, is positioned on the mounting pins 70. A ceramic nozzle 14 follows which sits with its recesses 88, shown in FIG. 16, on the mounting pins 70. A fuel feed 72, which is connected to the fuel needle 22, is next seated on the nozzle 14. This fuel feed 72 is also positioned by the mounting pins 70. The fuel feed 72 is supplied with fuel by the fuel line 110 in which the fuel sensor 112 is located. The fuel feed 72 is followed by a spring 74 which is also seated on the mounting pins 70. The spring 74 is held by clamping disks 76 which sit immovably on the mounting pins 70. The spring 74 is shown in the tensioned state in which the legs of the spring 74 are parallel to the interposed disks 76. In the released state of the spring 74 the legs of the spring are bent upward in the direction toward the interposed disks 76. A glow pin (not shown) is positioned in this assembly according to the embodiment of a nozzle 14 shown in FIG. 15 and is held by a wire spring (not shown) which is supported on the nozzle 14.

By this assembly process, the fuel feed 72 and thus the fuel needle 22 are automatically aligned with respect to the nozzle 14. Therefore, only two components are involved which influence the fuel feed and the mixing of the fuel with combustion air so that very small, precise tolerances can be maintained. This type of installation is made possible by the mounting pins 70. Likewise, the glow pin 64 can be positioned exactly with respect to the nozzle 14 and the reformer 10.

The production of the structure shown in FIG. 17 can be fully automated. In particular, since the installation direction is uniformly axial only "threading" of the parts must be carried out. While the seal 78 enables thermal insulation, coupling of the nozzle ceramic 14 to the metal of the heat shield 108 and tolerance equalization to be achieved. The system of the invention can be advantageously mounted by power-controlled pressing of the clamp disks 76 onto the mounting pins 70 such that, with regard to the heat and temperature properties of the system, uniform prerequisites can be established. Furthermore, as a result of the spring force applied by spring 74, the tolerances as a result of different heating of the components, different final temperatures of the components and different coefficients of temperature expansion can be equalized.

What is claimed is:

1. System for converting fuel and air into reformate comprising:
   a reformer which has a reaction space,
   a nozzle for supplying a fuel/air mixture to the reaction space, wherein the nozzle is a Venturi nozzle having a longitudinal axis and which includes an air inlet area and a diffuser area positioned downstream with respect to the air inlet area and flaring outwardly therefrom, and
   a fuel feed for supplying fuel to the air inlet area of the nozzle,
   wherein the Venturi nozzle includes an essentially cylindrical part with a hole formed therein that is slanted relative to the longitudinal axis for holding a glow pin in a fixed position relative to the nozzle.

2. System as claimed in claim 1, wherein the Venturi nozzle includes an opening angle in the diffuser area which is variable along a length of the diffuser area.

3. System as claimed in claim 1, wherein the fuel feed includes a fuel needle in the vicinity of the air inlet area for supplying liquid fuel.

4. System as claimed in claim 1, wherein the fuel feed comprises a pipe and a gas-atomizing nozzle for supplying a fuel/air mixture to the Venturi nozzle.

5. System as claimed in claim 4, wherein the gas-atomizing nozzle is another Venturi nozzle.

6. System as claimed in claim 1, further including means for supplying secondary air into the reaction space.

7. System as claimed in claim 1, wherein the fuel feed comprises a fuel needle, and
   wherein for the ratio of the inside diameter $d_i$ to the outside diameter $d_a$ of the fuel needle is according to the following relationship:

$$0.7 \leq d_i/d_a < 1.$$

8. System as claimed in claim 7, wherein the Venturi nozzle is axially symmetrical, and the fuel needle is aligned axially with the Venturi nozzle.

9. System as claimed in claim 7, wherein an exit plane of the liquid fuel extends out of the fuel needle perpendicular to the flow direction of the liquid fuel through the fuel needle.

10. System as claimed in claim 7, wherein an exit plane of the liquid fuel extends out of the fuel needle obliquely to the flow direction of the liquid fuel through the fuel needle.

11. System as claimed in claim 7, wherein an exit opening of the fuel needle includes tips and/or crenelations.

12. System as claimed in claim 3, wherein the air inlet area comprises a second essentially cylindrical part which includes a transition to the diffuser area and an exit opening of the fuel needle is located in the second essentially cylindrical part at an axial distance from the transition to the diffuser area.

13. System as claimed in claim 3, further including installation of the system in a motor vehicle, wherein an exit opening of the fuel needle is located above the axis of the Venturi nozzle.

14. System as claimed in claim 1, wherein the air inlet area includes means for air guidance which imparts a swirl to the in-flowing air.

15. System as claimed in claim 14, wherein the air guidance means comprise an air-guiding device which includes a plurality of swirl blades.

16. System as claimed in claim 15, wherein the swirl blades are located on a carrier mounted on the nozzle and wherein a pair of swirl blades along with the carrier and the nozzle form a conical channel.

17. System as claimed in claim 14, wherein the air guidance means includes a pot-shaped sleeve attached to the nozzle having an end wall and peripheral wall and having axial air holes in an end wall and peripheral air holes in the peripheral wall.

18. System as claimed in claim 17, wherein the peripheral air holes are formed substantially tangentially to the peripheral wall.

19. System as claimed in claim 17, wherein air guide blades are located on the peripheral air holes.

20. System as claimed in claim 14, wherein the nozzle is composed of a ceramic material and the air guidance means is formed as a single piece with the nozzle.

21. System as claimed in claim 1, further including a glow pin, wherein the hole in the nozzle holds the glow pin.

22. System as claimed in claim 14, wherein the air guidance means forms channels which are offset with respect to the radial directions of the nozzle.

23. System as claimed in claim 14, wherein the air guidance means includes essentially triangular base surfaces having rounded corners.

24. System as claimed in claim 1, wherein the hole in the nozzle slanted relative to the axis of the nozzle is located in the diffuser area spaced from the air inlet area.

25. System as claimed in claim 1, wherein the essentially cylindrical part includes a shoulder having an enlarged diameter relative to the essentially cylindrical part and wherein the hole penetrates the shoulder.

26. System as claimed in claim 1, further including mounting pins,
wherein the essentially cylindrical part includes a shoulder having an enlarged diameter relative to the essentially cylindrical part, and
wherein the shoulder includes a plurality of recesses for holding the mounting pins.

27. System as claimed in claim 1, further including
means for holding the nozzle and the fuel feed,
at least two axially aligned mounting pins mounted on the reformer,
wherein the nozzle and the fuel feed further include a positioning means which interacts with the mounting pins,
wherein the means for holding the nozzle and fuel feed interact with the mounting pins, and
wherein the reformer, the nozzle and the fuel feed are located in succession on the longitudinal axis.

28. System as claimed in claim 27, wherein the means for holding the nozzle and fuel feed is a spring which is held on the mounting pins by clamp disks.

29. System as claimed in claim 27, wherein the mounting pins are welded to the reformer.

30. System as claimed in claim 1, further including a seal positioned between the nozzle and the reformer.

31. System as claimed in claim 30, wherein the seal has at least one mica layer facing the reformer and at least one graphite layer facing the nozzle.

32. System as claimed in claim 1, wherein the fuel feed comprises a metal mesh.

33. A process for installation of a system for conversion of fuel and air into reformate of claim 27, comprising the steps of:
guiding the nozzle in the axial direction onto the mounting pins,
guiding the fuel feed in the axial direction onto the mounting pins, and
guiding the means for holding the nozzle and fuel feed in the axial direction onto the mounting pins.

34. The process as claimed in claim 33, wherein prior to guiding the nozzle onto the mounting pins a seal is guided in the axial direction onto the mounting pins.

35. The process as claimed in claim 33, wherein the means for holding the nozzle and fuel feed is a spring and further comprising the step of guiding in a force-controlled manner the spring onto the mounting pins via interaction of clamp disks to fix the spring in its assembled position.

* * * * *